Patented Nov. 1, 1927.

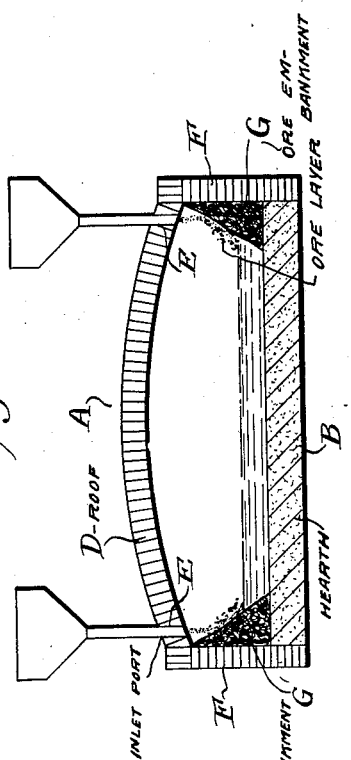
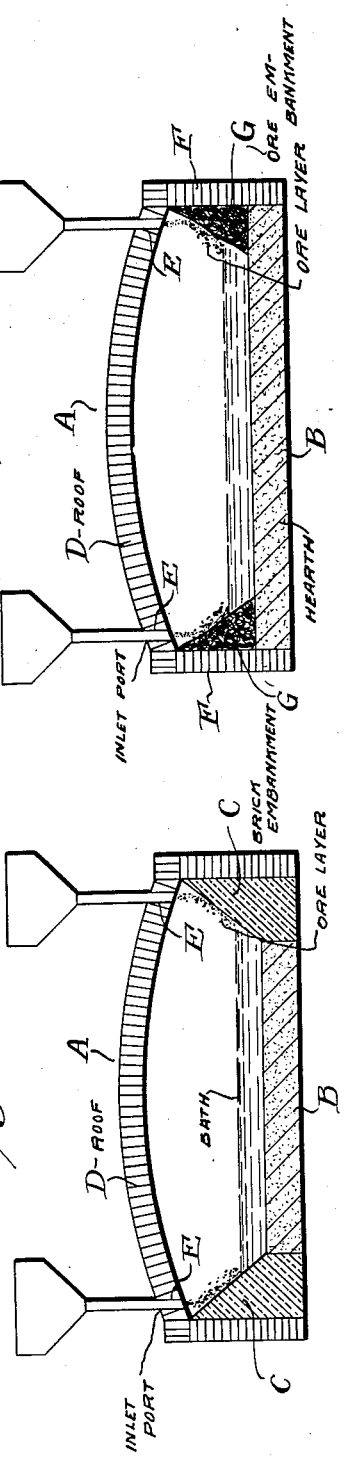
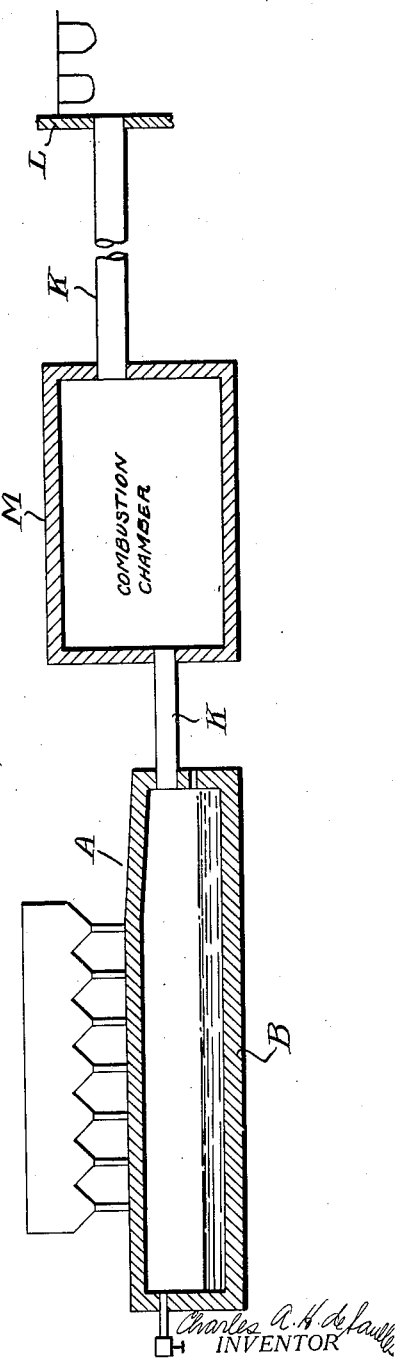

1,647,279

UNITED STATES PATENT OFFICE.

CHARLES A. H. DeSAULLES, OF WESTBURY, NEW YORK, ASSIGNOR TO AMERICAN SMELTING AND REFINING COMPANY, OF NEW YORK, N. Y., A CORPORATION OF NEW JERSEY.

PROCESS FOR RECOVERING ZINC OXIDE.

Application filed December 31, 1921, Serial No. 526,307. Renewed March 29, 1927.

This invention relates to the treatment of zinciferous ores to produce zinc oxide of commercial purity directly from the ore.

The invention relates broadly to the treatment of either simple zinc ores, concentrates or products in which zinc is the only valuable metal present, or complex ores and mixtures, which contain various metallic and non-metallic mineral constituents, such as copper, lead, sulphur and the precious metals, in an open furnace capable of handling large tonnages of ore and corresponding in capacity and dimensions with the reverberatory furnaces that are now in use.

It is well known that zinc oxide is readily contaminated by various products of combustion and that discoloration quickly occurs under unfavorable conditions and that such zinc oxide must be re-treated in order to meet the specification of zinc oxide of commercial purity and color. It is also known that it is difficult to reduce and recover zinc and its various compounds from slag and that the slag formed in the treatment of zinc ores often carries considerable quantities of the metal values, amounting frequently to from eight to ten percent, which is lost because of the cost of the several treatments necessary to reduce and separate the zinc therefrom.

According to my process, the zinc ores or concentrates, either oxidized or unoxidized and either totally or partially roasted or in their natural condition, with the addition of such reducing material as may be necessary, are subjected to the intense heat of a reverberatory furnace in the form of a relatively thin layer, which is fed to the furnace in such a manner that the zinc and other volatile metallic constituents of the ore will be reduced and volatilized preferably before the ore has reached the slag level of the furnace and in all events before the ore particles have become fused or submerged in the slag which covers the hearth of the furnace.

The volatilized products are immediately partially or totally oxidized in the combustion space of the furnace above the slag level, and are then conducted from the furnace, and the volatile products, such as zinc and lead, may be collected in a settling chamber or bag-house in the usual manner.

Preferably the ore is supplied to the furnace over a sloping embankment which extends to a point close to the feed inlet openings arranged in the roof of the furnace adjacent to the side wall. These inlet openings are as close together as possible with safety to the roof, and the ore is fed over the inclined face of the sloping wall or embankment in a practically continuous layer or sheet, spread over the embankment which exposes the mixture of ore and carbonaceous material to the intense heat of the furnace, causing reduction and volatilization of the zinc and lead to take place before the slag level of the furnace has been reached.

Instead of a permanent embankment, integral with the structure of the furnace itself, siliceous material, or ores containing an appreciable percentage of silica, may be introduced into the furnace adjacent to the side walls to form a sloping embankment and at the same time protect the side walls against the corrosive action of the slag. After this embankment has been formed, zinc ores can be introduced (forming the outer layer of the embankment and may be replenished from time to time as smelting continues. This embankment, whether formed by siliceous material or ores, or as an integral part of the furnace structure itself, possesses a relatively flat angle of incline, so that the ore will travel downward at a relatively slow speed over the face thereof. The partially fused ore, if any reaches the slag level near the bottom of the incline, tends to spread out in a layer or sheet over the top of the slag of the bath resting on the hearth of the furnace, where it is quickly fused and reduced by the heat.

A suitable form of furnace for carrying out my improved process is shown diagrammatically in the accompanying drawings, in which:

Fig. 1 illustrates a sectional view of a reverberatory furnace having a sloping wall or embankment formed integral therewith;

Fig. 2 is a diagrammatic sectional view of a furnace having vertical side walls with an embankment of siliceous material; and Fig. 3 is a diagrammatic section of a reverberatory furnace and settling chamber or bag-house.

Referring to the drawings, A indicates a reverberatory furnace, preferably rectangular in shape, provided with the usual refractory hearth B. The embankment C, having its exterior surface lined by refractory bricks, forms the side walls of the furnace, which support the roof D, that is pierced at frequent intervals adjacent the walls with inlet or feeding ports E.

In the furnace illustrated in Fig. 2 the side walls F of the furnace are vertical, and an embankment of siliceous material or ores G is placed adjacent thereto. This embankment, which may or may not be identical with the material being treated, provides support for the outer layer of ore indicated at H which is spread over the embankment and is exposed to the heat of the furnace. The furnace is connected by means of a flue K with a bag-house or settling chamber L, whereby the volatilized metallic products are carried from the furnaces with the gases and collected. If desired, a combustion chamber may be interposed between the furnace and the chamber H, as indicated at M.

In operation the temperature of the furnace is maintained sufficiently high to produce rapid smelting of the ore so that the maximum capacity of the furnace may be obtained. A temperature up to 2400° F. may be employed, and the volatile metals, such as lead and zinc, are promptly volatilized and pass off as a fume into the combustion space of the furnace, where they are wholly or partially oxidized. In the case of simple zinc ores, all of the waste material goes into the slag. In the case of complex ores and sulfids, however, any copper, together with the gold and the greater part of the silver, will enter the matte formed with the sulphur present in the charge. If the ore is such that a portion of the zinc and lead forms a sulfid in the matte, it may be removed by introducing a suitable flux, such as oxide of iron, in excess of the quantity necessary to form the slag. The matte formed may be tapped out and the valuable constituents recovered in any well known manner. The slag normally rises to a height indicated by the dotted lines and is tapped out through suitable tap-holes, when the slag rises above its predetermined level.

By means of this process I am able to obtain zinc oxide of commercial purity directly from both simple and complex zinc ores. The process is continuous in operation and utilizes furnaces of large capacity, and considerable tonnages are successfully handled. The ores are subjected to the furnace heat for appreciable periods of time in relatively small quantities before they come into contact with the slag, so that a considerable portion of the volatile metallic constituents of the ore may be volatilized free from contact with the slag. Consequently the recovery of the metal values from the treatment of very large tonnages of ore in one operation compares favorably with the recovery obtained from the treatment of relatively small tonnages of ore according to present day practice.

What I claim as my invention is:

1. The herein-described process for recovering the volatile metal constituents of ores which consists in mixing the ores with a reducing material and subjecting the same in a thin layer to the heat of a reverberatory furnace while spread upon a sloping embankment within the furnace.

2. The herein-described process for recovering the volatile metal constituents of ores, which consists in mixing the ores with a reducing agent and subjecting the same in a thin layer to the heat of a reverberatory furnace while moving over an inclined suface within the furnace, thereby to volatilize the zinc and lead contained in the ore while said ore continues in motion.

3. The herein-described process for recovering volatile metals contained in ores which consists in subjecting the ores to the heat of a reverberatory furnace in the presence of a reducing material, causing said ores and reducing materials to spread in a relatively thin layer over an inclined surface provided in said furnace, permitting the slag and waste to settle on the hearth of the furnace, and conducting the volatilized metals from the upper portion of said furnace.

4. The herein-described process for recovering the volatile metals contained in ores, which consists in subjecting the ores to the heat of a reverberatory furnace in the presence of a reducing material, causing the ore and reducing material to move slowly in a relatively thin layer over an inclined surface having a relatively flat angle of incline within the furnace formed by siliceous material adjacent the wall of the furnace, and removing and collecting the volatilized metals from said furnace in the form of a fume.

5. The herein-described process for recovering zinc oxide from ores containing zinc, which consists in subjecting the ores in a thin layer to the heat of a reverberatory furnace, while spread over an embankment within the furnace having a relatively flat angle of incline and extending from near the roof approximately to the normal slag line in the presence of a reducing agent, thereby to reduce and volatilize the zinc before the ore is submerged in the slag.

6. The herein-described process for recovering volatile metals contained in ores which consists in subjecting the ores to intense heat in the presence of a reducing material, causing said ores and reducing materials to move slowly in a relatively thin layer while exposed to such heat, permitting the slag and waste to drain away from the mixture, and conducting the volatilized metals out of the influence of the heat.

7. The herein-described process for recovering volatile metals contained in ores which consists in subjecting the ores to intense heat in the presence of a reducing material, causing said ores and reducing materials to move solely by gravity slowly in a relatively thin layer over an inclined surface while exposed to such heat and the volatile metals to vaporize before said mixture reaches the bottom of the inclined surface, and conducting the volatilized metals out of the influence of the heat.

8. The herein-described process for recovering volatile metals contained in ores which consists in subjecting the ores to intense heat sufficient to vaporize the volatile metals and smelt the ores in the presence of a reducing material, causing said ores and reducing materials to spread in a relatively thin layer over an inclined supporting surface formed of siliceous material while exposed to said heat, and conducting the volatilized metals out of the influence of the heat.

Signed at New York in the county of New York and State of New York this 21st day of December, A. D. 1921.

CHARLES A. H. DeSAULLES.